United States Patent
Park et al.

(10) Patent No.: US 8,245,295 B2
(45) Date of Patent: Aug. 14, 2012

(54) APPARATUS AND METHOD FOR DETECTION OF MALICIOUS PROGRAM USING PROGRAM BEHAVIOR

(75) Inventors: Taejoon Park, Seoul (KR); Kang Geun Shin, Ann Arbor, MI (US); Xin Hu, Ann Arbor, MI (US); Abhijit Bose, Ann Arbor, MI (US)

(73) Assignees: Samsung Electronics Co., Ltd., Suwon-si (KR); The Regents of the University of Michigan, Ann Arbor, MI (US)

( * ) Notice: Subject to any disclaimer, the term of this patent is extended or adjusted under 35 U.S.C. 154(b) by 857 days.

(21) Appl. No.: 12/099,649

(22) Filed: Apr. 8, 2008

(65) Prior Publication Data

US 2009/0049549 A1    Feb. 19, 2009

Related U.S. Application Data

(60) Provisional application No. 60/948,778, filed on Jul. 10, 2007.

(30) Foreign Application Priority Data

Oct. 4, 2007    (KR) .................... 10-2007-0099977

(51) Int. Cl.
*H04L 29/06* (2006.01)
*G06F 11/00* (2006.01)
*G06F 12/14* (2006.01)
*G06F 12/16* (2006.01)
*G06F 21/00* (2006.01)
*G08B 23/00* (2006.01)
*H04L 9/32* (2006.01)

(52) U.S. Cl. ............. 726/22; 726/23; 726/26; 713/176; 713/186

(58) Field of Classification Search ................ None
See application file for complete search history.

(56) References Cited

U.S. PATENT DOCUMENTS

| | | | |
|---|---|---|---|
| 7,854,004 B2 * | 12/2010 | van der Made | 726/23 |
| 2003/0023852 A1 * | 1/2003 | Wold | 713/176 |
| 2004/0117648 A1 * | 6/2004 | Kissel | 713/200 |
| 2005/0071432 A1 * | 3/2005 | Royston, III | 709/206 |
| 2005/0223234 A1 * | 10/2005 | McOwan et al. | 713/186 |
| 2006/0156404 A1 * | 7/2006 | Day | 726/23 |
| 2008/0060079 A1 * | 3/2008 | Shimizu et al. | 726/26 |
| 2009/0265784 A1 * | 10/2009 | Waizumi et al. | 726/23 |

* cited by examiner

*Primary Examiner* — Shin-Hon Chen
(74) *Attorney, Agent, or Firm* — NSIP Law

(57) ABSTRACT

An apparatus and method of diagnosing whether a computer program executed in a computer system is a malicious program and more particularly, an apparatus and method of diagnosing whether a computer program is a malicious program using a behavior of a computer program, and an apparatus and method of generating malicious code diagnostic data is provided. The apparatus for diagnosing a malicious code may include a behavior vector generation unit which generates a first behavior vector based on a behavior signature extracted from a diagnostic target program; a diagnostic data storage unit which stores a plurality of second behavior vectors for a plurality of sample programs predetermined to be malicious or normal; and a code diagnostic unit which diagnoses whether the diagnostic target program is a malicious code by comparing the first behavior vector with the plurality of second behavior vectors.

17 Claims, 10 Drawing Sheets

APPARATUS AND METHOD FOR DETECTION OF MALICIOUS PROGRAM USING PROGRAM BEHAVIOR

CROSS-REFERENCE TO RELATED APPLICATIONS

This application claims the benefit under 35 U.S.C. §119(e) of U.S. Provisional Application No. 60/948,778, filed on Jul. 10, 2007 in the U.S. Patent and Trademark Office, and the benefit under 35 U.S.C. §119(b) of Korean Patent Application No. 10-2007-0099977, filed on Oct. 4, 2007 in the Korean Intellectual Property Office, the entire disclosure of both of which are incorporated herein by reference.

BACKGROUND

The following description relates generally to an apparatus and method of diagnosing whether a computer program executed in a computer system is a malicious program, and more particularly, to an apparatus and method of diagnosing whether a computer program is a malicious program using a behavior of a computer program, and an apparatus and method of generating malicious code diagnostic data.

Conventional malicious program detection technology collects samples of known malicious programs, extracts a character string that is the signature of the malicious program from the collected samples, and determines whether a particular computer is infected with the malicious program by determining whether the extracted character string exists in the files of a diagnostic target computer system, and the like.

When a new malicious program is discovered, a malicious program diagnosing apparatus must be developed to identify the new malicious program, extract a predetermined character string that is the signature of the new malicious program, and detect the malicious program. The existing malicious program diagnosing apparatus may not detect the new malicious program before information about the new malicious program is added. As a result, damages from the new malicious program may not be prevented. In addition, the number of character strings that are the signatures of malicious programs increase in proportion to the increase in the number of malicious programs. Therefore, it takes more time for the malicious program diagnosing apparatus to detect the existence of the character string that is the signature of the malicious program.

For example, in the case of a mobile device that is supplied with power using a battery and the like, such as a mobile phone, a personal digital assistant (PDA), and other like mobile devices, the mobile device consumes power to extract a character string from a particular computer program and verify whether the extracted character string is the same as a character string corresponding to the signature of an existing malicious program. As a result, time available to run the mobile device is inevitably reduced due to power consumed for malicious program detection.

Furthermore, according to conventional practices, if a hacker's attacks reveal a vulnerability of a computer, a program manufacturer may guard against the hacker's attacks using a patch program that corrects the vulnerability. However, there are no distinct solutions for other attacks on any other underlying vulnerabilities.

Most malicious programs are not new programs that differ significantly from existing malicious programs. Instead, most malicious programs are variants of existing malicious programs. However, in order to detect the variants of the malicious program, a new character string that is extracted from each variant must be used instead of a character string that is extracted from the existing malicious program. Therefore, a plurality of character strings must be provided to detect a plurality of variants, respectively.

SUMMARY

In one general aspect, an apparatus and method of diagnosing a malicious code which can determine whether a particular computer program is either a normal code or a malicious code by using a behavior of a computer program executed in a computer system.

In another general aspect, an apparatus and method of generating malicious code diagnostic data is provided for determining whether a computer program executed in a computer system is either a normal code or a malicious code.

In yet another general aspect, an apparatus for diagnosing a malicious code includes a behavior vector generation unit which generates a first behavior vector based on a behavior signature extracted from a diagnostic target program; a diagnostic data storage unit which stores a plurality of second behavior vectors for a plurality of sample programs predetermined to be malicious; and a code diagnostic unit which diagnoses whether the diagnostic target program is a malicious code by comparing the first behavior vector with the plurality of second behavior vectors.

According to yet another aspect a method of diagnosing a malicious code includes generating a first behavior vector based on a behavior signature extracted from a diagnostic target program; loading a plurality of second behavior vectors for a plurality of sample programs predetermined to be malicious; and diagnosing whether the diagnostic target program is a malicious code by comparing the first behavior vector with the plurality of second behavior vectors.

According to still another aspect an apparatus for generating malicious code diagnostic data includes a behavior vector generation unit which generates each behavior vector from a plurality of sample programs predetermined to be malicious; a weight vector determination unit which determines a weight vector based on each behavior vector for the plurality of sample programs and whether the sample program is malicious; and a diagnostic data storage unit which stores each behavior vector and the weight vector, wherein each behavior vector and the weight vector are used for determining whether a diagnostic target program is a malicious code.

According to yet another aspect, a method of generating malicious code diagnostic data includes generating each behavior vector from a plurality of sample programs predetermined to be malicious; determining a weight vector based on each behavior vector for the plurality of sample programs and whether the sample program is malicious; and storing each behavior vector and the weight vector, wherein each behavior vector and the weight vector are used for determining whether a diagnostic target program is a malicious code.

Other features will be apparent from the detailed description, drawings, and claims.

BRIEF DESCRIPTION OF THE DRAWINGS

Throughout the drawings and the detailed description, like reference numerals refer to the like elements.

DETAILED DESCRIPTION

Figure 1:
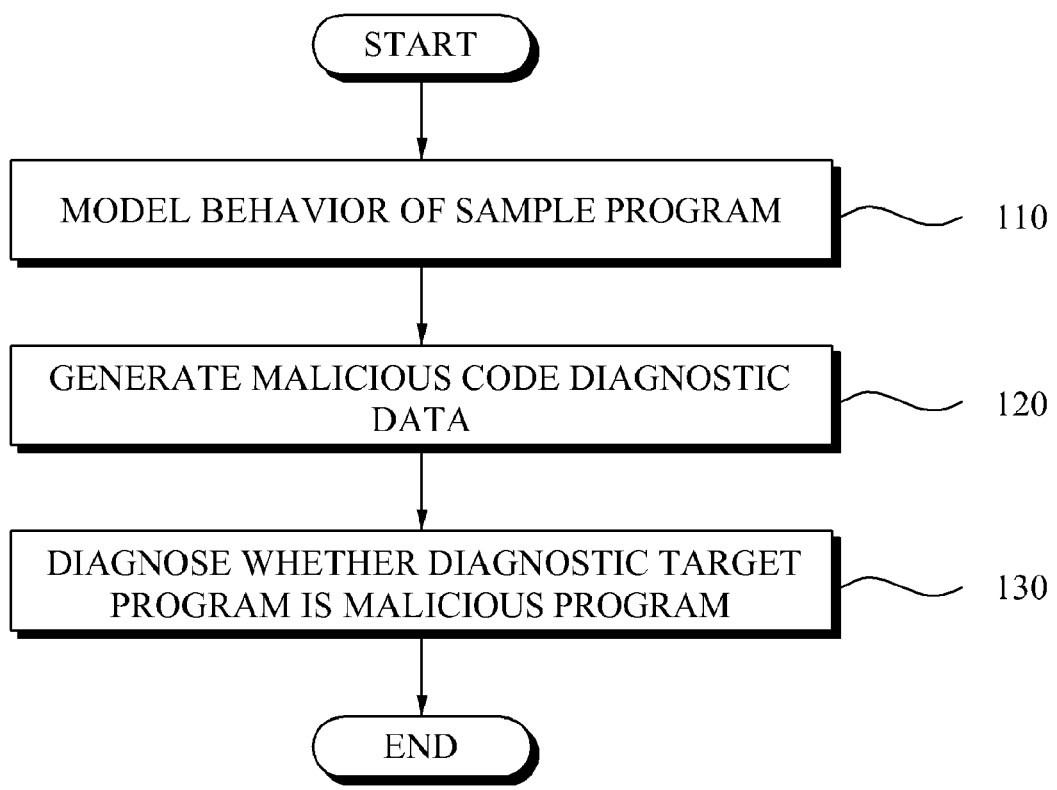
FIG. 1 is a flowchart illustrating an exemplary method of detecting a malicious program using behavior of a computer program.

FIG. 1 is a flowchart illustrating an exemplary method of detecting a malicious program using a behavior of a computer program. Hereinafter, the method of detecting a malicious program by using the modeled behavior of the computer program according to the present exemplary embodiment of the present invention is described in detail with reference to FIG. 1.

The term "malicious program" or "malicious code" described may be used to denote programs with malicious intent, for example, programs that are created to intentionally cause damage to user data and various types of executable programs operating on a computer system, such as a macro, a script, and the like.

As shown in FIG. 1, a behavior of a sample program is modeled and a behavior vector is generated (110). The sample program includes both a malicious program and a normal program.

Malicious code diagnostic data is generated (120). An apparatus for diagnosing a malicious code may classify programs as a malicious program and a normal program using the malicious code diagnostic data and the generated behavior vector. In one example, the apparatus for diagnosing a malicious code may calculate a value greater than or equal to a threshold value with respect to a behavior vector that is generated by modeling the behavior of a normal program, and to calculate a value less than the threshold value with respect to the behavior vector that is generated by modeling the behavior of a malicious program.

The diagnostic target program executed in the computer system is diagnosed as either a normal program or a malicious program using the behavior vector generated from the diagnostic target program and the generated malicious code diagnostic data (130).

When the diagnostic target program is a normal program, a malicious program detection apparatus calculates the value to be greater than or equal to the threshold value with respect to the behavior vector of the diagnostic target program. Conversely, when the diagnostic target program is a malicious program, the malicious program detection apparatus calculates the value to be less than the threshold value with respect to the behavior vector of the diagnostic target program.

Most new malicious programs do not differ from existing malicious programs. Specifically, new malicious programs are only variants of existing malicious programs that are developed, for example, by partially modifying the existing malicious programs. However, even thought new malicious programs may not differ from existing malicious programs, a conventional malicious program detection apparatus may not detect a variant of the existing malicious program. In addition, the behavior of the new malicious program may be similar to the behavior of the existing malicious program.

Furthermore, many malicious programs are very similar in that the malicious programs invade a user's computer system and delete/alter the user's data, system files, and the like.

Accordingly, using the behavior of the diagnostic target program to determine whether the diagnostic target program is either a normal program or a malicious program may result in more accurate detection of a malicious program when compared to existing detection method that compare character strings. In addition, as described below, it is possible to determine whether the diagnostic target program is a malicious program using the behavior, even in the case of an unknown new variant.

Unlike the conventional malicious program detection, it is unnecessary to analyze information about the new malicious program. Accordingly, it is possible to reduce damage that may occur while analyzing the new malicious program.

Figure 2:
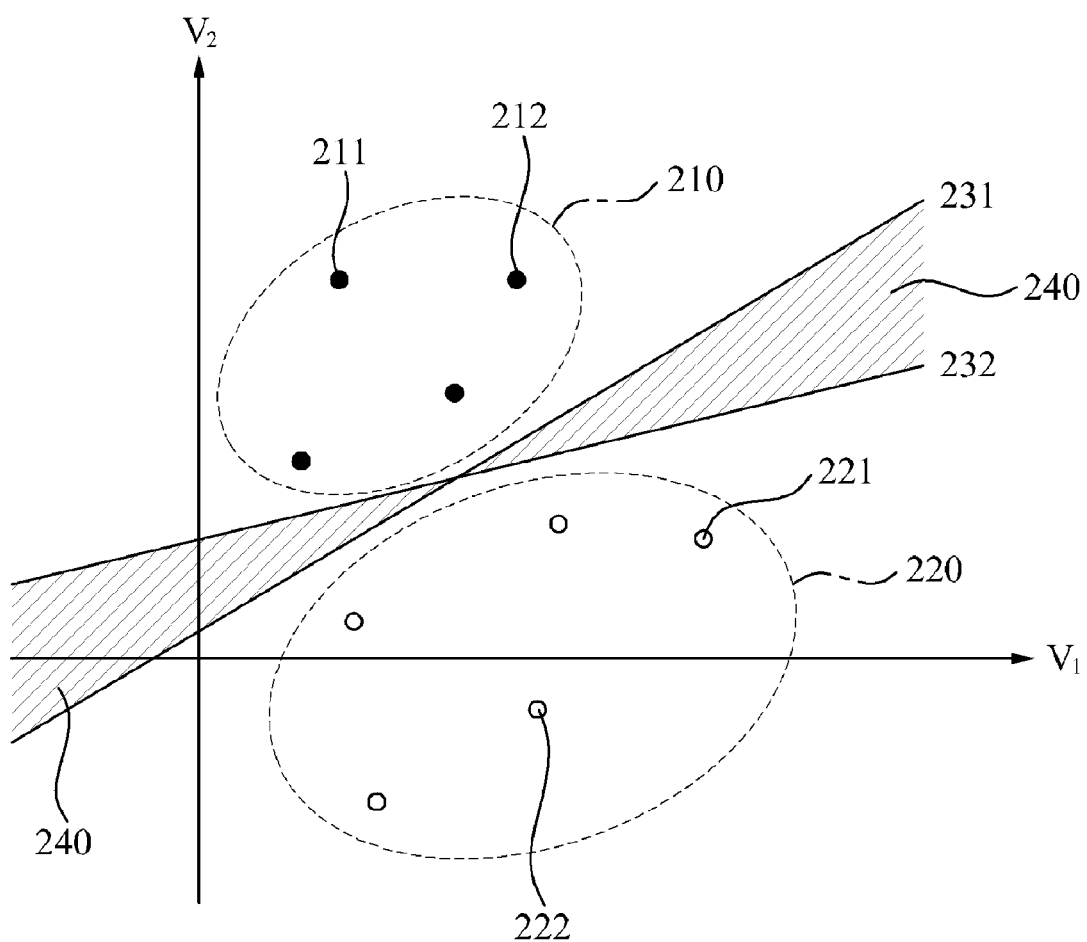
FIG. 2 illustrates an example of a behavior vector generated from a sample program in a behavior vector space.

FIG. 2 illustrates an example of a behavior vector generated from a sample program in a behavior vector space. A concept of diagnosing whether a diagnostic target program is a malicious program using a behavior vector generated from the diagnostic target program is described in detail with reference to FIG. 2.

Although the example shown in FIG. 2 is described with regard to two behavior vectors 211 and 212 generated from a normal program and two behavior vectors 221 and 222 generated from a malicious program as being located in a two-dimensional behavior vector space, the example is given for illustration purposes only and for convenience of description. The description, including the methods and apparatus described herein also may be applied to a dimension of a behavior vector space that is more than two dimensions.

Behavior signatures extracted from a normal program are relatively similar to each other, and behavior signatures extracted from a malicious program are relatively similar to each other. However, the behavior signatures extracted from a normal program and the behavior signatures extracted from a malicious program are significantly different. Accordingly, a normal behavior vector and a malicious behavior vector generated based on each behavior signature extracted from a normal program and a malicious program are different from each other. The normal behavior vectors 211 and 212 and the malicious behavior vectors 221 and 222 are located in spaces classified in behavior vector spaces 210 and 220.

Therefore, the apparatus for diagnosing a malicious code classifies the behavior vector space into a normal behavior vector space 210 in which the normal behavior vectors 211 and 212 are located, and a malicious behavior vector space 220 in which the malicious behavior vectors 221 and 222 are located. The apparatus for diagnosing the malicious code may determine whether the diagnostic target program corresponds to a malicious code based on a location the behavior vector generated from the diagnostic target program in one of the normal behavior vector space 210 and the malicious behavior vector space 220.

Various apparatuses 231 and 232 can classify the behavior vector space into the normal behavior vector space 210 and the malicious behavior vector space 220.

In the diagnostic target programs corresponding to behavior vectors located in a specific space 240 in the behavior vector space, a result of diagnosing whether the diagnostic target program is a malicious code may be different based on each apparatus for diagnosing a malicious code.

Figure 3:
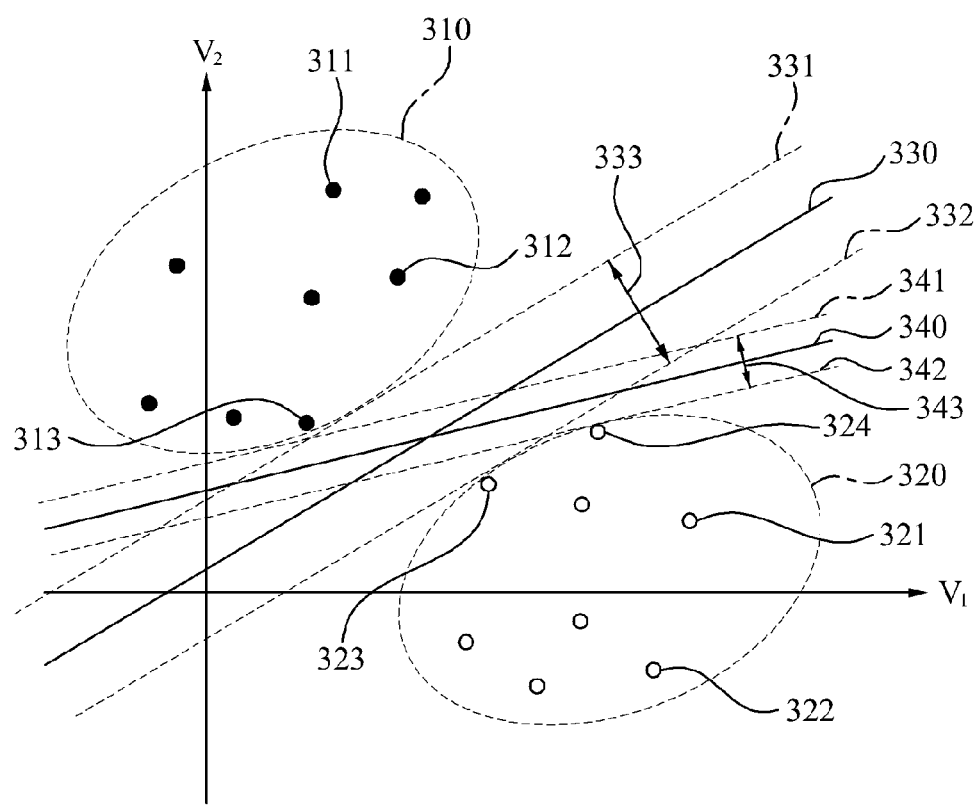
FIG. 3 illustrates an exemplary concept of selecting optimum data from malicious code diagnostic data that classifies a behavior vector space into a malicious vector space and a normal vector space.

FIG. 3 illustrates one exemplary concept of selecting optimum data from malicious code diagnostic data to classify a behavior vector space into a malicious vector space and a normal vector space. Hereinafter, the concept of selecting the optimum data is described in detail with reference to FIG. 3.

Normal behavior vectors 311, 312, and 313 are located in a normal behavior vector space 310, and malicious behavior vectors 321, 322, 323, and 324 are located in a malicious behavior vector space 320. An apparatus for diagnosing a malicious code may classify the behavior vector space into two spaces using a first boundary 330 and a second boundary 340. The first boundary 330 and the second boundary 340 are determined based on diagnostic data used by the apparatus for diagnosing a malicious code.

A margin corresponding to a distance 333 between the normal behavior vector 313 and the malicious behavior vector 323 located nearest to the first boundary 330 may be included when the behavior vector space is classified into the two spaces using the first boundary 330.

When the behavior vector space is classified into the two spaces using the second boundary 340, a margin corresponding to a distance 343 between the normal behavior vector 313 and the malicious behavior vector 324 located nearest to the second boundary 340 may be included.

In one example, the distances 333 and 343 of margins may be maximized so that the apparatus for diagnosing a malicious code may more accurately diagnose whether the diagnostic target program is malicious. Therefore, the apparatus for diagnosing a malicious code may accurately determine whether the behavior vector generated from the diagnostic target program belongs to either the normal behavior vector space 310 or the malicious behavior vector space 320 using the first boundary 330 in which the distance classifying the behavior vector space into the two spaces 310 and 320 is maximized.

The apparatus for diagnosing a malicious code may accurately diagnose a normal program and a malicious program when the distance between the normal behavior vector space 310 and the malicious behavior vector space 320 is maximized. Since a boundary by which the apparatus for diagnosing a malicious code classifies the behavior vector space into the normal behavior vector space 310 and the malicious behavior vector space 320 is determined by the malicious code diagnostic data, the malicious code diagnostic data enabling the apparatus for diagnosing a malicious code to use the first boundary is the optimum malicious code diagnostic data.

Figure 4:
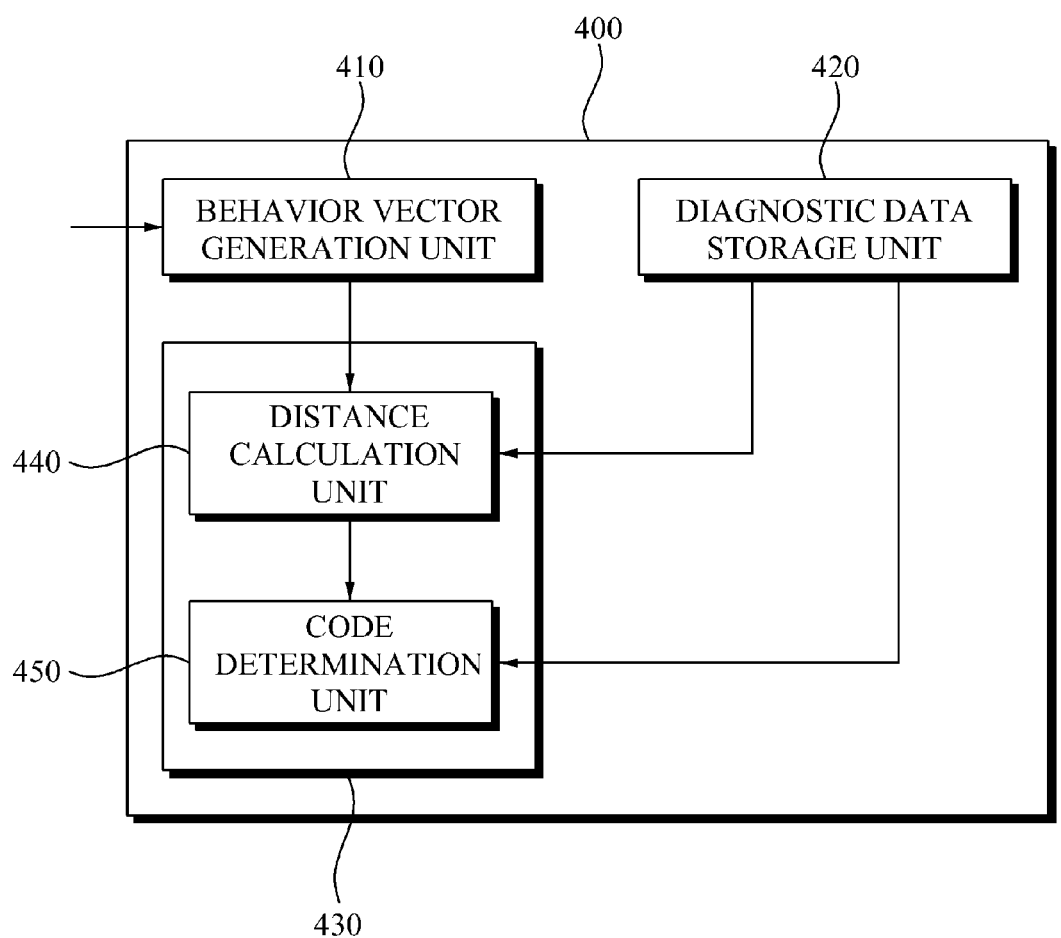
FIG. 4 is a block diagram illustrating an exemplary structure of an apparatus for diagnosing a malicious code that diagnoses whether a diagnostic target program is the malicious code based on a behavior vector generated from the diagnostic target program.

FIG. 4 is a block diagram illustrating an exemplary structure of an apparatus 400 for diagnosing a malicious code that diagnoses whether a diagnostic target program is a malicious code based on a behavior vector generated from the diagnostic target program. Hereinafter, the structure of the apparatus 400 for diagnosing a malicious code is described in detail with reference to FIG. 4.

The apparatus 400 for diagnosing a malicious code includes a behavior vector generation unit 410, a diagnostic data storage unit 420, and a code diagnostic unit 430.

The behavior vector generation unit 410 generates a first behavior vector based on a behavior signature extracted from a diagnostic target program.

The diagnostic data storage unit 420 stores a plurality of second behavior vectors for a plurality of sample programs that are predetermined to be malicious and/or normal. In one example, the plurality of sample programs may include at least one normal program and at least one malicious program.

According to one general aspect provided herein, the diagnostic data storage unit 420 stores a weight vector generated based on the plurality of second behavior vectors corresponding to the plurality of predetermined malicious and/or normal sample programs.

The code diagnostic unit 430 diagnoses whether the diagnostic target program is a malicious code by comparing the first behavior vector with the plurality of second behavior vectors.

In one example, the code diagnostic unit 430 includes a distance calculation unit 440 that calculates and compares each distance between the first behavior vector and the plurality of second behavior vectors. The diagnostic unit also may include a code determination unit 450 that determines whether the diagnostic target program is a malicious code based on the calculated distance.

According to one general aspect provided herein, the code determination unit 450 compares a distance between the behavior vector of a normal program and the behavior vector of the diagnostic target program, and a distance between the behavior vector of a malicious program and the behavior vector of the diagnostic target program. The code determination unit 450 determines whether the behavior vector of the diagnostic target program belongs to the normal behavior vector space 310 or the malicious behavior vector space 320 based on the compared distances, and determines whether the diagnostic target program is a malicious program based on the determination of which space the behavior vector belongs to.

In one example, the distance calculation unit 440 may calculate a Euclidean distance between the first behavior vector and the plurality of second behavior vectors.

The behavior vector space is classified into the normal behavior vector space 310 and the malicious vector space 320.

In one example, the diagnostic data storage unit 420 stores a weight vector that is determined based on the second behavior vector of each sample program and whether the sample program is malicious or normal. The code determination unit 450 may determine where the behavior vector of the diagnostic target program is located from among the normal behavior vector space 310 and the malicious behavior vector space 320 by comparing a determined threshold value to a value calculated by multiplying the calculated distance and an element of the weight vector.

In one example, the code determination unit 450 multiplies the calculated distance and the element of the weight vector according to a value of Equation 1:

$$f(x) = \sum_{i=1}^{m} y_i \cdot \alpha_i \cdot K(x, x_i),$$ [Equation 1]

where x denotes a first behavior vector extracted from a diagnostic target program, and $x_i$ denotes an i-th element of a second behavior vector extracted from an i-th sample program;

$y_i$ denotes whether an i-th sample program is malicious or normal, and according to a general aspect described herein, denotes the i-th sample program is a normal program when $y_i$ is '−1', and denotes the i-th sample program is a malicious program when $y_i$ is '+1'; m denotes the number of sample programs; $\alpha_i$ denotes an i-th element of a weight vector; and K(a,b) denotes a value that is inversely proportional to the distance between two behavior vectors a and b, and is determined by Equation 2:

$$K(a, b) = e^{-\left(\frac{\|a-b\|^2}{2\sigma^2}\right)},$$ [Equation 2]

σ denotes a constant having a predetermined value;

In one example, σ may be '1'.

When $\alpha_i$ is not equal to 0, $x_i$ is stored in the diagnostic data storage unit 420 and is used for a calculation of the above-described Equation 1. Accordingly, the plurality of second behavior vectors other than $x_i$ does not affect the calculation of the above-described Equation 1. When $\alpha_i$ is not equal to 0, $x_i$ is referred to as a support vector. Since support vectors are generally located near either the first boundary 330 or the second boundary 340, the number of support vectors is less than the number of sample programs. Accordingly, a storage amount of the diagnostic data storage unit 420 and a calculated amount of the above-described Equation 1 are reduced.

In one general aspect described herein, the code determination unit 450 determines where the behavior vector of the diagnostic target program is located in the normal behavior vector space 310 or the malicious behavior vector space 320 by comparing the value determined from the above-described Equation 1 with a threshold value determined by Equation 3:

$$b = \frac{1}{2}\sum_{i=1}^{m} \alpha_i \cdot y_i \cdot [K(x_i, x_r) + K(x_i, x_s)],$$ [Equation 3]

where b denotes the determined threshold value, $x_r$ denotes a second behavior vector extracted from a normal sample program, and $x_s$ denotes a second behavior vector extracted from a malicious sample program.

According to one general aspect described herein, the code determination unit 450 adds the determined threshold value to the value of the above-described Equation 1. When a calculation result is less than or equal to '0', the behavior vector of the diagnostic target program may be determined to be located in the normal behavior vector space 310. When the calculation result is greater than '0', the behavior vector of the diagnostic target program may be determined to be located in the malicious behavior vector space 320.

According to one general aspect described herein, the code determination unit 450 may determine that when a value determined using Equation 4 (shown below) is less than or equal to '0', the behavior vector of the diagnostic target program is located in the normal behavior vector space 310, and when the value of Equation 4 is greater than '0', the behavior vector of the diagnostic target program is located in the malicious behavior vector space 320.

$$f(x) = \text{sgn}\left(\sum_{i=1}^{m} y_i \cdot \alpha_i \cdot K(x, x_i) + b\right).$$ [Equation 4]

Figure 5:
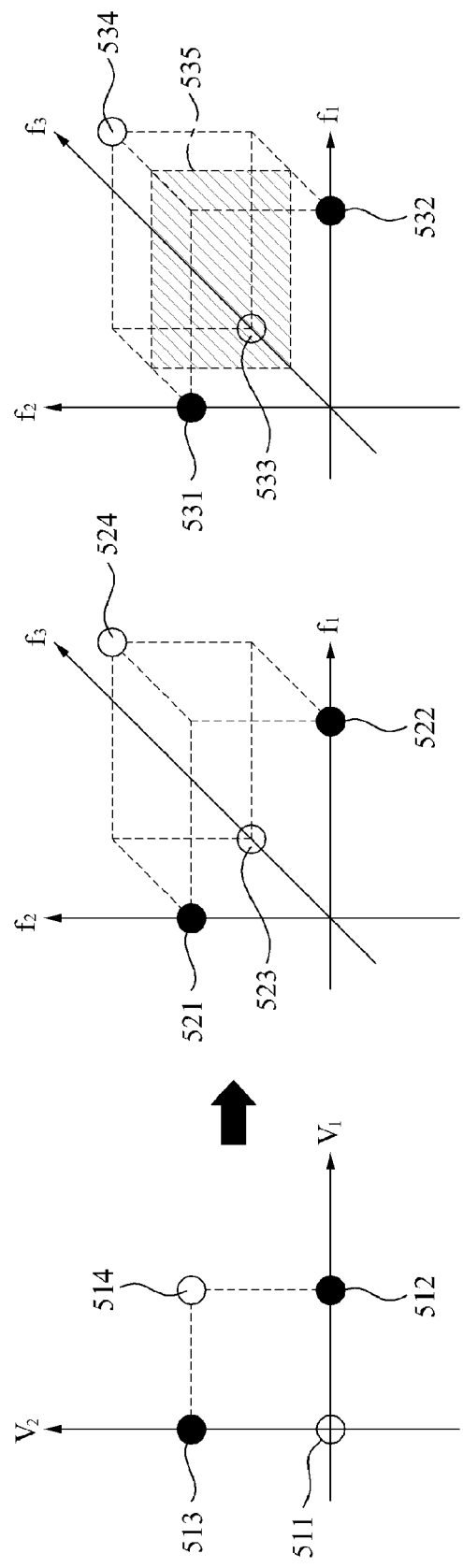
FIG. 5 illustrates an exemplary concept of diagnosing whether a diagnostic target program is a malicious program based on a higher-dimensional feature vector converted from a behavior vector when whether the diagnostic target program is the malicious program may not be determined by using the behavior vector generated from the diagnostic target program.

FIG. 5 illustrates an exemplary concept of diagnosing whether a diagnostic target program is a malicious program based on a higher-dimensional feature vector converted from a behavior vector when it may not be determined whether the diagnostic target program is a malicious program using the behavior vector generated from the diagnostic target program. Below, the concept of diagnosing whether the diagnostic target program is a malicious program using the higher-dimensional feature vector converted from the behavior vector is described in detail with reference to FIG. 5.

As shown in FIG. 5, a first graph 510 illustrates that normal behavior vectors 511 and 512 and malicious behavior vectors 513 and 514 are located in a behavior vector space. The normal behavior vectors 511 and 512 and the malicious behavior vectors 513 and 514 are located in the entire behavior vector space without a fixed rule. The entire behavior vector space may not be classified into the normal behavior vector space 310 and the malicious behavior vector space 320.

A second graph 520 of FIG. 5 illustrates each generated feature vector 521, 522, 523, and 524, respectively, converted from the normal behavior vectors 511 and 512 and the malicious behavior vectors 513 and 514, in a feature vector space.

The second graph 520 illustrated a two-dimensional behavior vector converted into a three-dimensional feature vector; however, the behavior vector may be converted into a higher-dimensional vector higher than the behavior vector, for example, the vector having a dimensionality higher than or equal to a four-dimensional vector.

As shown in FIG. 5, a third graph 530 illustrates feature vectors of a normal program 531 and 532 and feature vectors of a malicious program 533 and 534 located in a feature vector space. Each feature vector 531, 532, 533, and 534, converted from the behavior vectors, is located in spaces classified in the feature vector space.

The feature vectors of a normal program 531 and 532 and the feature vectors of a malicious program 533 and 534 may be classified using a specific boundary 535.

Figure 6:
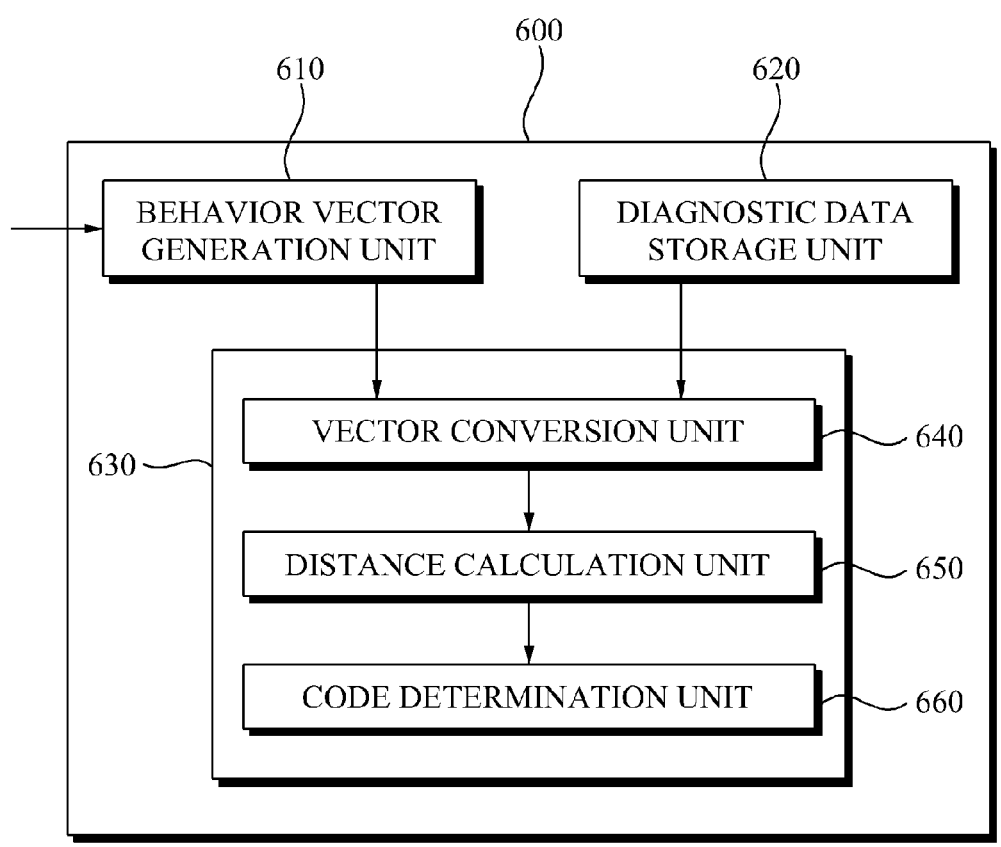
FIG. 6 is a block diagram illustrating an exemplary structure of an apparatus for diagnosing a malicious code that diagnoses whether a diagnostic target program is the malicious code based on a feature vector generated from the diagnostic target program.

FIG. 6 is a block diagram illustrating an exemplary structure of an apparatus 600 for diagnosing a malicious code that diagnoses whether a diagnostic target program is a malicious code based on a feature vector generated from the diagnostic target program. The structure of the apparatus 600 for diagnosing a malicious code that diagnoses whether the diagnostic target program is the malicious code based on the feature vector is described in detail with reference to FIG. 6.

According to an example, the apparatus 600 for diagnosing a malicious code includes a behavior vector generation unit 610, a diagnostic data storage unit 620, and a code diagnostic unit 630.

In one example, the code diagnostic unit 630 includes a vector conversion unit 640, a distance calculation unit 650, and a code determination unit 660.

The behavior vector generation unit 610 generates a first behavior vector based on a behavior signature extracted from a diagnostic target program.

The diagnostic data storage unit 620 stores a plurality of second behavior vectors for a plurality of sample programs that are predetermined to be malicious or normal. According to this example, the plurality of sample programs may include at least one normal program and at least one malicious program.

In one example, the diagnostic data storage unit 620 stores a weight vector generated based on the plurality of second behavior vectors for the plurality of sample programs and whether each sample program is malicious or normal.

The code diagnostic unit 630 diagnoses whether the diagnostic target program is a malicious code by comparing the first behavior vector with the plurality of second behavior vectors.

According to example, the code diagnostic unit 630 includes the vector conversion unit 640 that converts the first behavior vector into a higher-dimensional first feature vector. The vector conversion unit 640 also converts the plurality of second behavior vectors into a plurality of higher-dimensional second feature vectors. The code diagnostic 630 unit also includes the distance calculation unit 650 that calculates each distance between the first feature vector and the plurality of second feature vectors. In addition, the code diagnostic unit 630 includes the code determination unit 660 that determines whether the diagnostic target program is a malicious code based on the calculated distance.

In one example, the vector conversion unit 640 may convert each vector so that each distance between the first feature vector converted from the first behavior vector and the plurality of second feature vectors converted from the plurality of second behavior vectors may be proportional to each distance between the first behavior vector and the plurality of second behavior vectors. Specifically, the vector conversion unit 640 converts the first behavior vector and the plurality of second behavior vectors so that each distance between the first feature vector and the plurality of second feature vectors may be proportional to each distance between the first feature vector corresponding to the first behavior vector and the plurality of second feature vectors corresponding to the plurality of second behavior vectors.

A feature vector space is classified into a normal feature vector space and a malicious feature vector space.

In one example, the diagnostic data storage unit 620 stores a weight vector that is determined based on the second feature vector of each sample program and whether the sample program is malicious or normal. The code determination unit 660 determines where the feature vector of the diagnostic target program is located from among the normal feature vector space and the malicious feature vector space by comparing a determined threshold value with a value calculated by multiplying the calculated distance and an element of the weight vector.

When the feature vector of the diagnostic target program is located in the normal feature vector space, the code determination unit 660 diagnoses the diagnostic target program as a normal program. When the feature vector of the diagnostic target program is located in the malicious feature vector space, the code determination unit 660 diagnoses the diagnostic target program as a malicious program.

Figure 7:
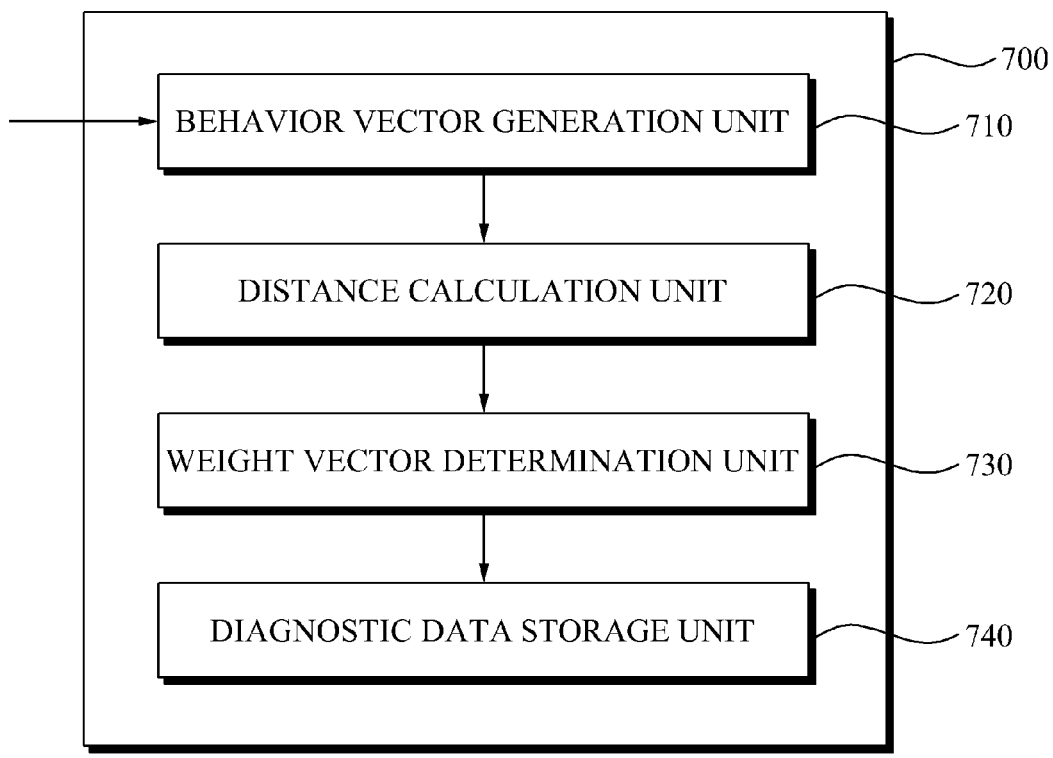
FIG. 7 is a block diagram illustrating an exemplary structure of an apparatus for generating malicious code diagnostic data by using a behavior vector of a sample program.

FIG. 7 is a block diagram illustrating an exemplary structure of an apparatus 700 for generating malicious code diagnostic data using a behavior vector of a sample program. The structure of the apparatus 700 for generating the malicious code diagnostic data is described below in detail with reference to FIG. 7.

The apparatus 700 for generating the malicious code diagnostic data includes a behavior vector generation unit 710, a distance calculation unit 720, a weight vector determination unit 730, and a diagnostic data storage unit 740.

The behavior vector generation unit 710 generates each behavior vector from a plurality of sample programs that are predetermined to be malicious or normal. In one example, the plurality of sample programs may include at least one normal program and at least one malicious program.

The weight vector determination unit 730 determines a weight vector based on each behavior vector for the plurality of sample programs and whether each of the plurality of sample programs is malicious or normal.

In one example, the distance calculation unit 720 calculates a distance between the plurality of behavior vectors generated from the plurality of sample programs, and the weight vector determination unit 730 determines the weight vector based on the calculated distance between the plurality of behavior vectors and whether the plurality of sample programs is malicious or normal.

The diagnostic data storage unit 740 stores the plurality of behavior vectors generated from the plurality of sample programs and the determined weight vector. The stored plurality of behavior vectors and the weight vector are used by the apparatus for diagnosing a malicious code to determine whether the diagnostic target program is a malicious code.

As shown in FIG. 3, the first boundary 330 and the second boundary 340 are determined by the weight vector. In one example, the weight vector determination unit 730 may select the weight vector most accurately classifying the normal behavior vector space 310 and the malicious behavior vector space 320 from among a plurality of weight vectors classifying the normal behavior vector space 310 and the malicious behavior vector space 320.

In one example, in order to accurately classify the behavior vector space into the normal behavior vector space 310 and the malicious behavior vector space 320, the weight vector determination unit 730 maximizes $w(\alpha)$ in accordance with Equation 5:

$$w(\alpha) = \sum_{i=1}^{m} \alpha_i - \frac{1}{2} \sum_{i=1}^{m} \sum_{j=1}^{m} \alpha_i \cdot \alpha_j \cdot y_i \cdot y_j \cdot K(x_i, x_j), \quad \text{[Equation 5]}$$

where $x_i$ denotes a behavior vector extracted from an i-th sample program, and $y_i$ denotes whether an i-th sample program is malicious or normal. According one aspect, when the i-th sample program is a normal program, $y_i$ is '−1', and when the i-th sample program is a malicious program, $y_i$ is '+1'. $K(a,b)$ denotes a distance between two behavior vectors a and b, m denotes a number of sample programs, and $\alpha_i$ denotes an i-th element of a weight vector.

The weight vector determination unit 730 also determines the weight vector in accordance with Equation 6 and Equation 7:

$$\alpha_i \geq 0, \text{and} \quad \text{[Equation 6]}$$

$$\sum_{i=1}^{m} \alpha_i \cdot y_i = 0 \quad \text{[Equation 7]}$$

In one example, the weight vector determination unit 730 determines a threshold value used for classifying the behavior vector space into the normal behavior vector space 310 and the malicious behavior vector space 320 according to Equation 8:

$$b = \frac{1}{2}\sum_{i=1}^{m} \alpha_i \cdot y_i \cdot [K(x_i, x_r) + K(x_i, x_s)],$$ [Equation 8]

where b denotes the determined threshold value, $x_r$ denotes a second behavior vector extracted from a normal sample program, and $x_s$ denotes a second behavior vector extracted from a malicious sample program.

Figure 8:
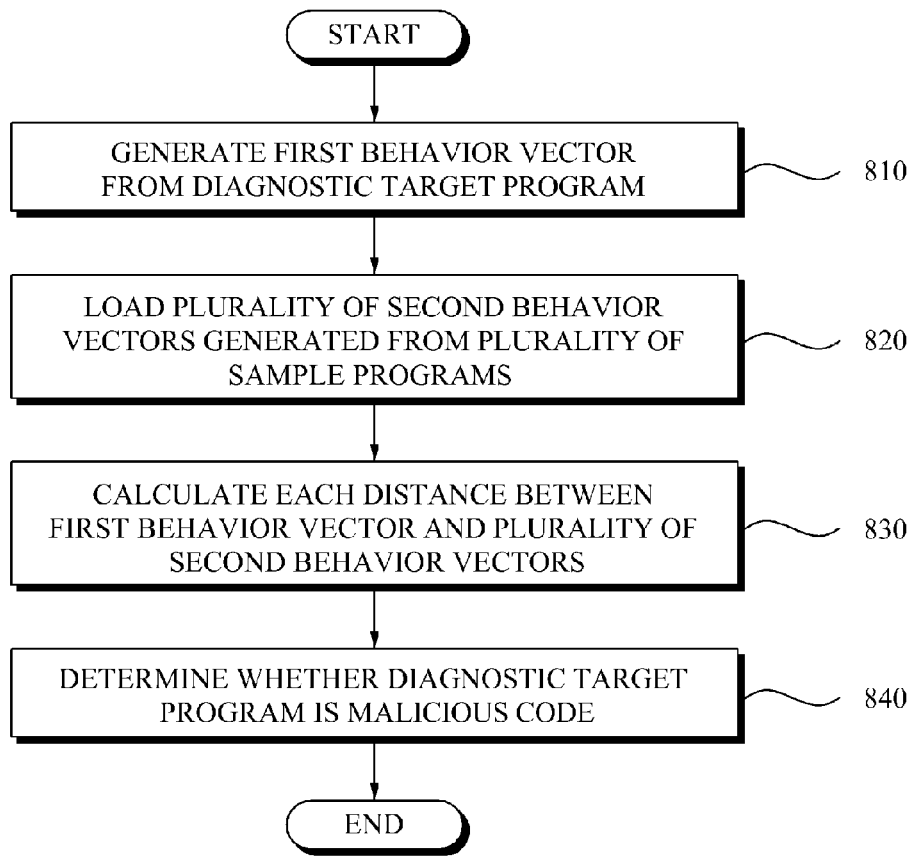
FIG. 8 is a flowchart illustrating a method of diagnosing whether a diagnostic target program is a malicious program by using a behavior vector of the diagnostic target program.

FIG. 8 is a flowchart illustrating an exemplary method of diagnosing whether a diagnostic target program is a malicious program using a behavior vector of the diagnostic target program. The method of diagnosing whether the diagnostic target program is a malicious program using the behavior vector described in detail below with reference to FIG. 8.

A first behavior vector is generated based on a behavior signature extracted from a diagnostic target program (810). In one example, only a partial behavior signature rather than an entire behavior signature is extracted from the diagnostic target program, and the first behavior vector is generated based on the partial behavior signature.

A plurality of second behavior vectors for a plurality of sample programs predetermined to be malicious or normal is loaded (820). In one example, the plurality of sample programs may include at least one normal program and at least one malicious program.

Each distance between the first behavior vector and the second behavior vector is calculated and compared (830). Each distance between the first behavior vector and the plurality of second behavior vectors is calculated in the case of the plurality of second behavior vectors. In one example, a Euclidean distance between the first behavior vector and the plurality of second behavior vectors is calculated (830).

It is determined whether the diagnostic target program is a malicious code based on the distance between behavior vectors calculated (840). In one example, the location of the behavior vector of the diagnostic target program is determined from among the normal behavior vector space 310 and the malicious behavior vector space 320 by comparing a determined threshold value with a value calculated by multiplying the calculated distance and an element of the weight vector. When the behavior vector of the diagnostic target program is located in the normal behavior vector space 310, the diagnostic target program is determined to be a normal program, and when the behavior vector of the diagnostic target program is located in the malicious behavior vector space 320, the diagnostic target program is determined to be a malicious program.

In one example, the calculated distance is multiplied by the element of the weight vector according to a value of Equation 9:

$$f(x) = \sum_{i=1}^{m} y_i \cdot \alpha_i \cdot K(x, x_i),$$ [Equation 9]

where x denotes a first behavior vector extracted from a diagnostic target program, $x_i$ denotes an i-th element of a second behavior vector extracted from an i-th sample program, and $y_i$ denotes whether an i-th sample program is malicious or normal. In one example, when the i-th sample program is a normal program, $y_i$ is '−1', and when the i-th sample program is a malicious program, $y_i$ is '+1'. m denotes a number of sample programs, and $\alpha_i$ denotes an i-th element of a weight vector. K(a,b) denotes a value being inversely proportional to a distance between two behavior vectors a and b, and is determined by Equation 10 shown below.

When $\alpha_i$ does not equal 0, $x_i$ is used for a calculation of the above-described Equation 9. Accordingly, the plurality of second behavior vectors other than $x_i$ does not affect the calculation of the above-described Equation 9. When $\alpha_i$ does not equal 0, $x_i$ is referred to as a support vector. Since support vectors are generally located near a boundary of the normal behavior vector space 310 and the malicious behavior vector space 320, the number of support vectors is less than the number of all sample programs, m. Accordingly, a calculated amount of the above-described Equation 9 is reduced.

$$K(a, b) = e^{-\left(\frac{\|a-b\|^2}{2\sigma^2}\right)},$$ [Equation 10]

where σ denotes a constant having a predetermined value, and in one example, σ is '1'.

In an example, the location of the behavior vector of the diagnostic target program is determined from among the normal behavior vector space 310 and the malicious behavior vector space 320 by comparing the value of the above-described Equation 9 with a determined threshold value calculated by Equation 11:

$$b = \frac{1}{2}\sum_{i=1}^{m} \alpha_i \cdot y_i \cdot [K(x_i, x_r) + K(x_i, x_s)],$$ [Equation 11]

where b denotes the determined threshold value, $x_r$ denotes a second behavior vector extracted from a normal sample program, and $x_s$ denotes a second behavior vector extracted from a malicious sample program.

According to an example, the determined threshold value is added to the value of Equation 9. When a calculation result is less than or equal to '0', the behavior vector of the diagnostic target program is determined to be located in the normal behavior vector space 310, and when the calculation result is greater than '0', the behavior vector of the diagnostic target program is determined to be located in the malicious behavior vector space 320.

According to an example, when a resulting value of Equation 12 shown below is less than or equal to '0', the behavior vector of the diagnostic target program may be determined to be located in the normal behavior vector space 310, and when the value of Equation 4 is greater than '0', the behavior vector of the diagnostic target program may be determined to be located in the malicious behavior vector space 320.

$$f(x) = \text{sgn}\left(\sum_{i=1}^{m} y_i \cdot \alpha_i \cdot K(x, x_i) + b\right).$$ [Equation 12]

Figure 9:
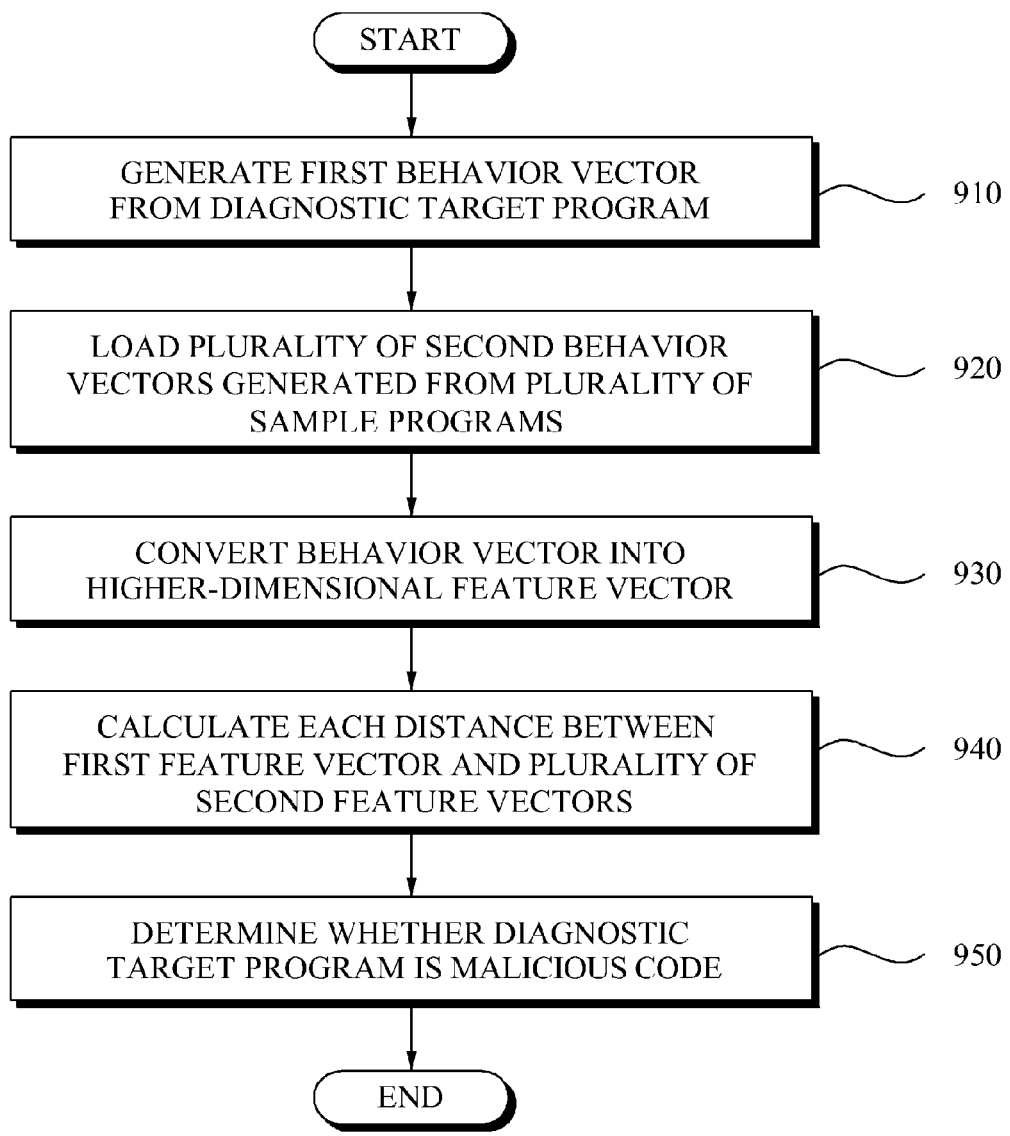
FIG. 9 is a flowchart illustrating a method of diagnosing whether a diagnostic target program is a malicious program by using a feature vector of the diagnostic target program.

FIG. 9 is a flowchart illustrating an exemplary method of diagnosing whether a diagnostic target program is a malicious program using a feature vector of the diagnostic target program. Hereinafter, the method of diagnosing whether the diagnostic target program is a malicious program using the feature vector is described in detail with reference to FIG. 9.

A first behavior vector is generated based on a behavior signature extracted from a diagnostic target program (910). According to an example, only a partial behavior signature rather than an entire behavior signature is extracted from the diagnostic target program, and the first behavior vector is generated based on the partial behavior signature.

A plurality of second behavior vectors for a plurality of sample programs predetermined in advance to be malicious or normal is loaded. According to an example, the plurality of sample programs may include at least one normal program and at least one malicious program.

According to an example, a weight vector is loaded (920). The weight vector is determined based on the plurality of second behavior vectors for the plurality of sample programs and whether each of the plurality of sample programs is malicious or normal.

The generated first behavior vector is converted into a higher-dimensional first feature vector, and the loaded plurality of second behavior vectors is converted into a plurality of higher-dimensional second feature vectors (930).

Each distance between the first feature vector and the plurality of second feature vectors is calculated (940).

It is determined whether the diagnostic target program is a malicious code based on the calculated distance (950). According to an example, the location of the feature vector of the diagnostic target program is determined from among the normal feature vector space and the malicious feature vector space by comparing a determined threshold value with a value calculated by multiplying the calculated distance and an element of the weight vector.

According to an example, when the feature vector of the diagnostic target program is located in the normal feature vector space, the diagnostic target program is determined to be a normal program, and when the feature vector of the diagnostic target program is located in the malicious feature vector space, the diagnostic target program is determined to be a malicious program.

Figure 10:
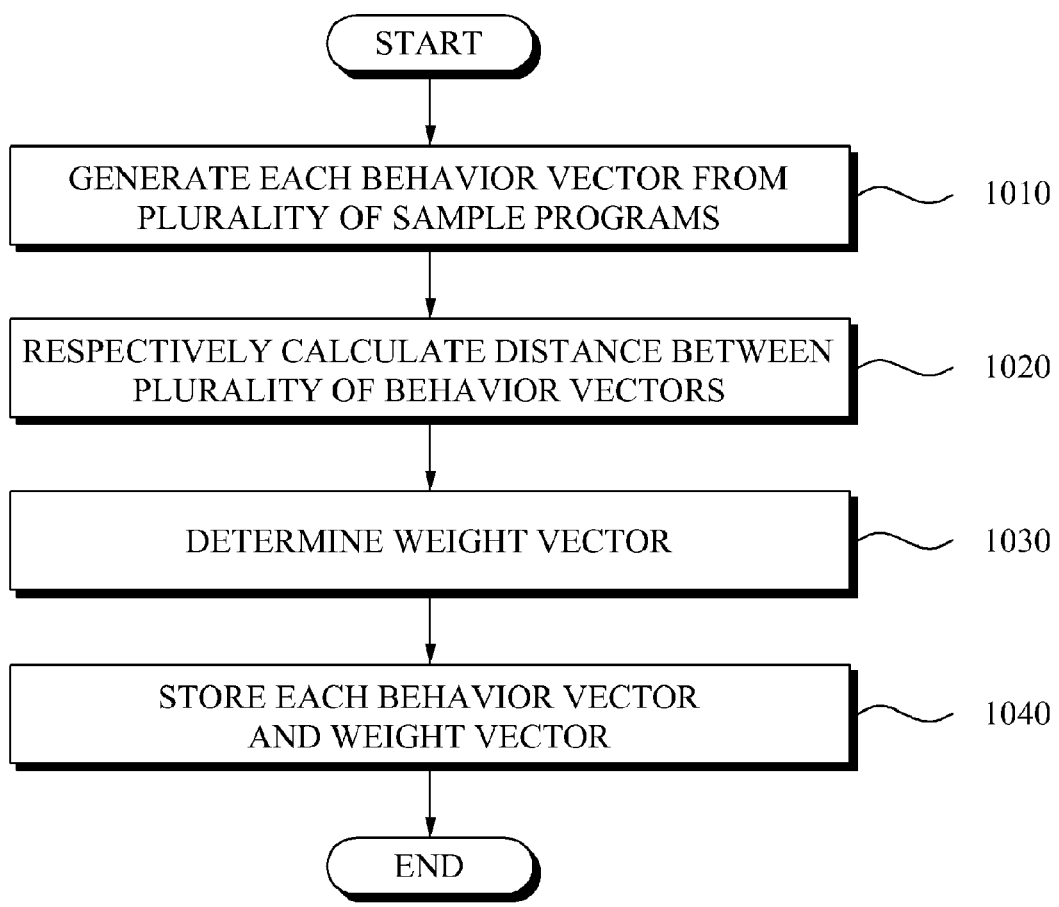
FIG. 10 is a flowchart illustrating an exemplary method of generating malicious code diagnostic data used for diagnosing whether a diagnostic target program is a malicious program by using a behavior vector of the diagnostic target program.

FIG. 10 is a flowchart illustrating an exemplary method of generating malicious code diagnostic data for diagnosing whether a diagnostic target program is a malicious program using a behavior vector of the diagnostic target program. Hereinafter, the method of generating the malicious code diagnostic data for diagnosing whether the diagnostic target program is a malicious program using the behavior vector is described in detail with reference to FIG. 10.

Each behavior vector is generated from a plurality of sample programs predetermined to be malicious or normal (1010). According to an example, the plurality of sample programs may include at least one normal program and at least one malicious program.

Each distance between the plurality of behavior vectors generated is calculated (1020). According to an example, the distance is a Euclidean distance.

The weight vector is determined based on the distance between the plurality of calculated behavior vectors and whether each of the plurality of sample programs is malicious.

According to an example, the weight vector $w(\alpha)$ in accordance with Equation 13 shown below is maximized in order to accurately classify the behavior vector space into the normal behavior vector space 310 and the malicious behavior vector space 320:

$$w(\alpha) = \sum_{i=1}^{m} \alpha_i - \frac{1}{2}\sum_{i=1}^{m}\sum_{j=1}^{m} \alpha_i \cdot \alpha_j \cdot y_i \cdot y_j \cdot K(x_i, x_j),$$ [Equation 13]

where $x_i$ denotes a behavior vector extracted from an i-th sample program, and $y_i$ denotes whether an i-th sample program is malicious or normal. According to an example, when the i-th sample program is a normal program, $y_i$ is '−1', and when the i-th sample program is a malicious program, $y_i$ is '+1'. $K(a,b)$ denotes a distance between two behavior vectors a and b, m denotes a number of sample programs, and $\alpha_i$ denotes an i-th element of a weight vector.

Also, the weight vector is determined in accordance with Equation 14 and Equation 15:

$$\alpha_i \geq 0, \text{ and}$$ [Equation 14]

$$\sum_{i=1}^{m} \alpha_i \cdot y_i = 0.$$ [Equation 15]

According to an example, a threshold value calculated by Equation 16 shown below is determined and used when the apparatus for diagnosing a malicious code determines whether the diagnostic target program is a malicious program.

$$b = \frac{1}{2}\sum_{i=1}^{m} \alpha_i \cdot y_i \cdot [K(x_i, x_r) + K(x_i, x_s)],$$ [Equation 16]

where b denotes the determined threshold value, $x_r$ denotes a second behavior vector extracted from a normal sample program, and $x_s$ denotes a second behavior vector extracted from a malicious sample program.

Each of the generated plurality of behavior vectors and the determined weight vector are stored (1040). According to an example, the determined threshold value may be stored.

The stored threshold value and the weight vector are used when the apparatus for diagnosing a malicious code determines whether the diagnostic target program is a malicious code.

The above-described examples may be recorded in computer-readable media including program instructions to implement various operations embodied by a computer. The media may also include, alone or in combination with the program instructions, data files, data structures, and the like. The media and program instructions may be those specially designed and constructed to carry out the above-described examples, or they may be of the kind well-known and available to those having skill in the computer software arts. Examples of computer-readable media include magnetic media, such as hard disks, floppy disks, and magnetic tape; optical media such as CD ROM disks and DVD; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the above-described exemplary processes. All or a portion of operations of the apparatus for diagnosing a malicious code and the apparatus for generating the malicious code diagnostic data described above may be embodied in the computer program and stored on a computer-readable media.

According to the above-described examples, there is provided an apparatus and method of diagnosing a malicious code to determine whether a particular computer program is either a normal code or a malicious code using a behavior of a computer program executed in a computer system.

According to the above-described examples, there is also provided an apparatus and method of generating malicious code diagnostic data used to determine whether a computer program executed in a computer system is either a normal code or a malicious code.

Although a few examples have been shown and described, it will be understood that various modifications may be made. For example, suitable results may be achieved if the described techniques are performed in a different order and/or if elements in the described systems and devices are combined in a different manner and/or replaced or supplemented by other components or their equivalents. Accordingly other implementations are within the scope of the following claims.

What is claimed is:

1. An apparatus for diagnosing malicious code, the apparatus comprising:
   a behavior vector generation unit configured to generate a first behavior vector based on a behavior signature extracted from a diagnostic target program;
   a diagnostic data storage unit configured to store a plurality of second behavior vectors for a plurality of sample programs predetermined to be malicious
   a code diagnostic unit configured to diagnose whether the diagnostic target program is a malicious code by comparing the first behavior vector with the plurality of second behavior vectors
   wherein the code diagnostic unit comprises:
   a distance calculation unit configured to calculate and compare each distance between the first behavior vector and the plurality of second behavior vectors; and
   a code determination unit configured to divide a vector space into a normal behavior vector space and a malicious behavior vector space, the vector space including the first behavior vector and the plurality of second behavior vectors, to determine whether the first behavior vector is located in the malicious behavior vector space, and to determine that the diagnostic target program is a malicious code when the first behavior vector is included in the malicious behavior vector space.

2. The apparatus of claim 1, wherein the distance is a Euclidean distance.

3. The apparatus of claim 1, wherein the code diagnostic unit comprises:
   a vector conversion unit configured to convert the first behavior vector into a higher-dimensional first feature vector, and converts the plurality of second behavior vectors into a plurality of higher-dimensional second feature vectors;
   a distance calculation unit configured to calculate each distance between the first feature vector and the plurality of second feature vectors; and
   a code determination unit configured to determine whether the diagnostic target program is a malicious code based on the calculated distance.

4. The apparatus of claim 1, wherein the diagnostic data storage unit stores a weight vector determined based on the second behavior vector of each sample program and whether the sample program is malicious, and
   the code determination unit determines whether the diagnostic target program is a malicious code by comparing a determined threshold value with a value calculated by multiplying the calculated distance and an element of the weight vector.

5. The apparatus of claim 4, wherein the code determination unit multiplies the calculated distance and the element of the weight vector according to a value of the following equation:

$$f(x) = \sum_{i=1}^{m} y_i \cdot \alpha_i \cdot K(x, x_i),$$

where x denotes a first behavior vector extracted from a diagnostic target program, $x_i$ denotes an i-th element of a second behavior vector extracted from an i-th sample program, $y_i$ denotes whether an i-th sample program is malicious or normal, m denotes a number of sample programs, and $\alpha_i$ denotes an i-th element of a weight vector, and K(a,b) denotes a value being inversely proportional to a distance between two behavior vectors a and b, and where K(a,b) is determined by the following equation:

$$K(a, b) = e^{-\left(\frac{\|a-b\|^2}{2\sigma^2}\right)},$$

where σ denotes a constant.

6. The apparatus of claim 5, wherein the determined threshold value is determined by the following equation:

$$b = \frac{1}{2} \sum_{i=1}^{m} \alpha_i \cdot y_i \cdot [K(x_i, x_r) + K(x_i, x_s)],$$

where b denotes the determined threshold value, $x_r$ denotes a second behavior vector extracted from a normal sample program, and $x_s$ denotes a second behavior vector extracted from a malicious sample program.

7. A method of diagnosing a malicious code, the method comprising:
   generating a first behavior vector based on a behavior signature extracted from a diagnostic target program;
   loading a plurality of second behavior vectors for a plurality of sample programs predetermined to be malicious; and
   diagnosing whether the diagnostic target program is a malicious code by comparing the first behavior vector with the plurality of second behavior vectors
   wherein the step of diagnosing comprises:
   calculating and comparing each distance between the first behavior vector and the plurality of second behavior vectors;
   dividing a vector space into a normal behavior vector space and a malicious behavior vector space, the vector space including the first behavior vector and the plurality of second behavior vectors,
   determining whether the first behavior vector is located in the malicious behavior vector space; and
   determining that the diagnostic target program is a malicious code when the first behavior vector is included in the malicious behavior vector space.

8. The method of claim 7, wherein the calculating and comparing calculates a Euclidean distance between each behavior vector.

9. The method of claim 7, wherein the diagnosing comprises:
converting the first behavior vector into a higher-dimensional first feature vector, and converting the plurality of second behavior vectors into a plurality of higher-dimensional second feature vectors;
calculating each distance between the first feature vector and the plurality of second feature vectors; and
determining whether the diagnostic target program is a malicious code based on the calculated distance.

10. The method of claim 7, wherein the determining determines whether the diagnostic target program is a malicious code by comparing a determined threshold value with a value calculated by multiplying the calculated distance and an element of the weight vector determined based on the second behavior vector of each sample program and whether the sample program is malicious.

11. An apparatus for generating malicious code diagnostic data, the apparatus comprising:
a behavior vector generation unit configured to generate behavior vectors for determining whether a diagnostic target program is a malicious code from a plurality of sample programs predetermined to be malicious;
a weight vector determination unit configured to determine a weight vector for determining whether a diagnostic target program is a malicious code based on each behavior vector for the plurality of sample programs and whether the sample program is malicious; and
a diagnostic data storage unit configured to store each behavior vector and the weight vector
a distance calculation unit configured to calculate and compare each distance between the first behavior vector and the plurality of second behavior vectors; and
a code determination unit configured to divide a vector space into a normal behavior vector space and a malicious behavior vector space, the vector space including the first behavior vector and the plurality of second behavior vectors, to determine whether the first behavior vector is located in the malicious behavior vector space, and to determine that the diagnostic target program is a malicious code when the first behavior vector is included in the malicious behavior vector space
wherein the weight vector determination unit determines the weight vector based on the calculated distance between the plurality of behavior vectors and whether the plurality of sample programs is malicious.

12. The apparatus of claim 11, wherein the weight vector determination unit maximizes w(α) in accordance with the following equation:

$$w(\alpha) = \sum_{i=1}^{m} \alpha_i - \frac{1}{2} \sum_{i=1}^{m} \sum_{j=1}^{m} \alpha_i \cdot \alpha_j \cdot y_i \cdot y_j \cdot K(x_i, x_j),$$

where $x_i$ denotes a behavior vector extracted from an i-th sample program, $y_i$ denotes whether an i-th sample program is malicious, K(a,b) denotes a distance between two behavior vectors a and b, m denotes a number of sample programs, and $\alpha_i$ denotes an i-th element of a weight vector, and the weight vector determination unit determines the weight vector in accordance with the following equations:

$\alpha_i \geq 0$, and $$\sum_{i=1}^{m} \alpha_i \cdot y_i = 0.$$

13. The apparatus of claim 12, wherein the weight vector determination unit determines a threshold value used for determining whether the diagnostic target program is the malicious code by the following equation:

$$b = \frac{1}{2} \sum_{i=1}^{m} \alpha_i \cdot y_i \cdot [K(x_i, x_r) + K(x_i, x_s)],$$

where b denotes the determined threshold value, $x_r$ denotes a second behavior vector extracted from a normal sample program, and $x_s$ denotes a second behavior vector extracted from a malicious sample program, and the diagnostic data storage unit stores the determined threshold value.

14. A method of generating malicious code diagnostic data, the method comprising:
generating each behavior vector for determining whether a diagnostic target program is a malicious code from a plurality of sample programs determined in advance whether to be malicious;
determining a weight vector for determining whether a diagnostic target program is a malicious code based on each behavior vector for the plurality of sample programs and whether the sample program is malicious;
storing each behavior vector and the weight vector;
calculating and comparing each distance between the first behavior vector and the plurality of second behavior vectors; and
dividing a vector space into a normal behavior vector space and a malicious behavior vector space, the vector space including the first behavior vector and the plurality of second behavior vectors,
determining whether the first behavior vector is located in the malicious behavior vector space; and
determining that the diagnostic target program is a malicious code when the first behavior vector is included in the malicious behavior vector space,
wherein the weight vector determination unit determines the weight vector based on the calculated distance between the plurality of behavior vectors and whether the plurality of sample programs is malicious.

15. The method of claim 14, wherein the determining maximizes w(α) in accordance with the following equation:

$$w(\alpha) = \sum_{i=1}^{m} \alpha_i - \frac{1}{2}\sum_{i=1}^{m}\sum_{j=1}^{m} \alpha_i \cdot \alpha_j \cdot y_i \cdot y_j \cdot K(x_i, x_j),$$

where $x_i$ denotes a behavior vector extracted from an i-th sample program, $y_i$ denotes whether an i-th sample program is malicious, $K(a,b)$ denotes a distance between two behavior vectors a and b, m denotes a number of sample programs, and $\alpha_i$ denotes an i-th element of a weight vector, and the determining determines the weight vector in accordance with the following equations:

$\alpha_i \geq 0$, and $$\sum_{i=1}^{m} \alpha_i \cdot y_i = 0.$$

16. The method of claim 15, wherein the determining determines a threshold value used for determining whether the diagnostic target program is the malicious code by the following equation:

$$b = \frac{1}{2}\sum_{i=1}^{m} \alpha_i \cdot y_i \cdot [K(x_i, x_r) + K(x_i, x_s)],$$

where b denotes the determined threshold value, $x_r$ denotes a second behavior vector extracted from a normal sample program, and $x_s$ denotes a second behavior vector extracted from a malicious sample program, and the storing stores the determined threshold value.

17. A non-transitory computer readable recording medium comprising a program implementing a method of diagnosing a malicious code stored on said computer-readable recording medium, the program including instructions to cause a computer to:

generate a first behavior vector based on a behavior signature extracted from a diagnostic target program;

load a plurality of second behavior vectors for a plurality of sample programs determined in advance whether to be malicious;

calculating and comparing each distance between the first behavior vector and the plurality of second behavior vectors;

dividing a vector space into a normal behavior vector space and a malicious behavior vector space, the vector space including the first behavior vector and the plurality of second behavior vectors, determining whether the first behavior vector is located in the malicious behavior vector space; and determining that the diagnostic target program is a malicious code when the first behavior vector is included in the malicious behavior vector space.

\* \* \* \* \*